(12) United States Patent
Jia et al.

(10) Patent No.: US 11,507,878 B2
(45) Date of Patent: Nov. 22, 2022

(54) ADVERSARIAL TRAINING FOR EVENT SEQUENCE ANALYSIS

(71) Applicant: Adobe Inc., San Jose, CA (US)

(72) Inventors: Xiaowei Jia, Minneapolis, MN (US);
Sheng Li, Suwanee, GA (US);
Handong Zhao, San Jose, CA (US);
Sungchul Kim, San Jose, CA (US)

(73) Assignee: Adobe Inc., San Jose, CA (US)

( * ) Notice: Subject to any disclaimer, the term of this patent is extended or adjusted under 35 U.S.C. 154(b) by 440 days.

(21) Appl. No.: 16/380,566

(22) Filed: Apr. 10, 2019

(65) Prior Publication Data

US 2020/0327446 A1     Oct. 15, 2020

(51) Int. Cl.
*G06N 20/00*     (2019.01)

(52) U.S. Cl.
CPC .................................. *G06N 20/00* (2019.01)

(58) Field of Classification Search
CPC ....................................................... G06N 20/00
See application file for complete search history.

(56) References Cited

PUBLICATIONS

Michel, Paul, et al. "On evaluation of adversarial perturbations for sequence-to-sequence models." arXiv preprint arXiv:1903.06620 (Year: 2019).*

Wang, Jiuniu, et al. "A3net: Adversarial-and-attention network for machine reading comprehension." CCF International Conference on Natural Language Processing and Chinese Computing. Springer, Cham, (Year: 2018).*

Chen et al., "Predictive analysis by leveraging temporal user behavior and user embeddings", In Proceedings of the 2018 CIKM, ACM, 8 pages.

Cisse et al., "Parseval networks: Improving robustness to adversarial examples", arXiv preprint arXiv:1704.08847, May 2, 2017, 10 pages.

Dai et al., "Semi-supervised sequence learning", arXiv preprint arXiv:1511.01432, Nov. 4, 2015, 10 pages.

(Continued)

*Primary Examiner* — Michael J Huntley
*Assistant Examiner* — Adam C Standke
(74) *Attorney, Agent, or Firm* — Finch & Maloney PLLC (57) ABSTRACT

Techniques are disclosed for the generation of adversarial training data through sequence perturbation, for a deep learning network to perform event sequence analysis. A methodology implementing the techniques according to an embodiment includes applying a long short-term memory attention model to an input data sequence to generate discriminative sequence periods and attention weights associated with the discriminative sequence periods. The attention weights are generated to indicate the relative importance of data in those discriminative sequence periods. The method further includes generating perturbed data sequences based on the discriminative sequence periods and the attention weights. The generation of the perturbed data sequences employs selective filtering or conservative adversarial training, to preserve perceptual similarity between the input data sequence and the perturbed data sequences. The input data sequence may be created by vectorizing a temporal input data stream comprising words, symbols, and the like, into a multidimensional vectorized numerical data sequence format.

20 Claims, 9 Drawing Sheets

(56) References Cited

PUBLICATIONS

Dong et al., "Sequence data mining", Springer Science & Business Media, 2007, vol. 33, 159 pages.

Gamboa, John, "Deep learning for time-series analysis", arXiv preprint arXiv:1701.01887, Jan. 7, 2017, 13 pages.

Gilmer et al., "The Relationship Between High-Dimensional Geometry and Adversarial Examples", arXiv preprint arXiv:1801.02774, Sep. 10, 2018, 15 pages.

Goodfellow et al., "Explaining and Harnessing Adversarial Examples", arXiv preprint arXiv:1412.6572, Mar. 20, 2015, 11 pages.

Graves, A., "Generating sequences with recurrent neural networks", arXiv preprint arXiv:1308.0850, Jun. 5, 2014, 43 pages.

Ienco et al., "Land cover classification via multitemporal spatial data by deep recurrent neural networks", arXiv preprint arXiv:1704.04055, Apr. 13, 2017, 7 pages.

Jia et al., "Incremental dual-memory LSTM in land cover prediction", In SIGKDD, ACM, 2017, 10 pages.

Kim, Y., "Convolutional neural networks for sentence classification", arXiv preprint arXiv:1408.5882, Sep. 3, 2014, 6 pages.

Kolter et al., "Provable defenses against adversarial examples via the convex outer adversarial polytope", 31st Conference on Neural Information Processing Systems (NIPS 2017), 2017, 21 pages.

Li et al., "A context-aware attention network for interactive question answering", In SIGKDD, ACM, 2017, 9 pages.

Lai, et al., "Recurrent convolutional neural networks for text classification", In AAAI, 2015, vol. 333, pp. 2267-2273.

Luong et al., "Effective approaches to attention-based neural machine translation", arXiv preprint arXiv:1508.04025, Sep. 20, 2015, 11 pages.

Ma et al., "A generic framework of user attention model and its application in video summarization", IEEE transactions on multimedia, 2002, vol. 7, pp. 907-919.

Madry et al., "Towards deep learning models resistant to adversarial attacks", arXiv preprint arXiv:1706.06083, Nov. 9, 2017, 27 pages.

Mcauley et al., "Hidden factors and hidden topics: understanding rating dimensions with review text", In RecSys' 13, ACM, Oct. 2013, 10 pages.

Mikolov et al., "Efficient estimation of word representations in vector space", arXiv preprint arXiv:1301.3781, Sep. 7, 2013, 12 pages.

Miyato et al., "Distributional smoothing with virtual adversarial training", arXiv preprint arXiv:1507.00677, Jun. 11, 2016, 12 pages.

Miyato et al., "Adversarial training methods for semi-supervised text classification", arXiv preprint arXiv:1605.07725, May 6, 2017, 11 pages.

Nayak et al., "Classifying multivariate time series by learning sequence-level discriminative patterns", In Proceedings of the 2018 SIAM International Conference on Data Mining, 2018, 10 pages.

Pang et al., "Seeing stars: Exploiting class relationships for sentiment categorization with respect to rating scales", In ACL, 2005, 10 pages.

Raghunathan et al., "Certified defenses against adversarial examples", arXiv preprint arXiv:1801.09344, Jan. 29, 2018, 15 pages.

Ross et al., "Improving the adversarial robustness and interpretability of deep neural networks by regularizing their input gradients", 2018, Association for the Advancement of Artificial Intelligence, 2018, 10 pages.

Rubwurm et al., "Temporal vegetation modelling using long short-term memory networks for crop identification from medium-resolution multi-spectral satellite images", In CVPR Workshops, Jul. 2017, pp. 11-19.

Rubwurm et al., "Multi-temporal land cover classification with sequential recurrent encoders", arXiv preprint arXiv:1802.02080, Apr. 7, 2018, 19 pages.

Tan et al., "Improved recurrent neural networks for session-based recommendations", arXiv preprint arXiv:1606.08117, Sep. 16, 2016, 6 pages.

Tang et al., "Document modeling with gated recurrent neural network for sentiment classification", In Proceedings of the 2015 conference on empirical methods in natural language processing, 2015, pp. 1422-1432.

Wang et al., "Baselines and bigrams: Simple, good sentiment and topic classification", In Proceedings of the 50th Annual Meeting of the Association for Computational Linguistics: Short Papers-vol. 2, 2012, pp. 90-94.

Xu et al., "Show, attend and tell: Neural image caption generation with visual attention", arXiv preprint arXiv:1502.03044, Apr. 19, 2016, 22 pages.

Yang et al., "Hierarchical attention networks for document classification", In Proceedings of the 2016 NAACL, 2016, 10 pages.

You et al., "Image captioning with semantic attention", arXiv preprint arXiv:1603.03925, Mar. 12, 2016, 10 pages.

Zugner et al., "Adversarial attacks on neural networks for graph data", arXiv preprint arXiv:1085.07984, 10 pages.

Figiel et al., "The dimension of almost spherical sections of convex bodies", Acta Mathematica, vol. 139, 1977, pp. 53-94.

\* cited by examiner

FIG. 1

Perturbations
200

An (enormously) entertaining (movie) like nothing (we)(ve) ever (seen) before and yet (completely) familiar.
　　　primarily　　　　　　film　　　　　they ive　met　　　　overwhelmingly Perturbation over entire sequence
210

An enormously ▓▓▓▓▓▓▓ ▓▓▓▓ like nothing we ve ever seen before and yet completely familiar.
　　　　　awesome　film Attention Aware Perturbations
220

ADVERSARIAL TRAINING FOR EVENT SEQUENCE ANALYSIS

FIELD OF THE DISCLOSURE

This disclosure relates to training of deep learning networks. Particularly, this disclosure relates to techniques for generating adversarial training data for a deep learning network configured to perform event sequence analysis.

BACKGROUND

There is a growing interest in applying deep learning techniques/models to the increasingly large volumes of available data, for the purpose of analysis and knowledge discovery. These deep learning systems are often trained using an adversarial training approach to improve model robustness against perturbations in the data. Existing systems attempt to augment training data by applying perturbations to the training data, which is to say, adding perturbed data instances to the training data for which the perturbations are based on the training data.

These augmentation methods generally focus on classifying static data such as images. In real world applications, however, data is often presented in a sequential format that is collected over a relatively lengthy period of time, and which may include much irrelevant information. Naïvely applying perturbations to training data of this type is inefficient and can produce undesirable results.

DETAILED DESCRIPTION

As noted previously, the study of sequential data has become increasingly important, given the availability and prevalence of sequential data in many application domains including natural language processing, signal processing, e-commerce, economics, and remote sensing, to name just a few areas. For example, the analysis of web browsing data in the domain of e-commerce, through the effective analysis of the sequential browsing history of a user, can improve predictions of purchasing behavior and provide a more personalized web experience for the user. Similarly, the analysis of sentences containing a sequence of words can generate classification results that more accurately describe the intent of the sentence.

As will be appreciated in light of this disclosure, recent advances in deep learning algorithms have provided unrealized potential for classifying sequential data. The power of these deep learning approaches stems from their ability to model underlying dependencies between data at different time steps in the sequence. These dependencies across time can provide the context information that enables learning of different sequential behaviors. The modeling of temporal dependencies can also facilitate the extraction of informative data from the entire sequence. Despite the power of deep learning in capturing complex data dependencies, the performance of deep learning algorithms can be further improved by augmenting training data with slightly perturbed data (e.g., where some elements of the input data have been substituted with alternative data elements). These perturbations are selected to adversely alter the model outputs, and they are commonly referred to as adversarial perturbations. This data augmentation strategy can help a deep learning network to learn a smooth distribution along every direction around each data point, as will be described in greater detail below.

To this end, it would be desirable to have techniques for training an analysis network for robustness against these types of adversarial perturbations in sequential data (e.g., data that is presented in a sequential format, possibly collected over an extended period of time and including much irrelevant information so that only part of the sequence is critical to the classification). Thus, the present disclosure provides adversarial training (AT) techniques, according to an embodiment, that augment available training data by adding more data variability (i.e., perturbations) to the training samples, and thus train the analysis network to learn a smoother or more reliable classification boundary. The perturbations are applied to the relatively "important" elements of the data sequence, which are referred to as discriminative sequence periods.

For instance, in an example use case, purchase predictions are made from sequential web browsing data during which a user decides to buy a product primarily because he/she is attracted to several relevant web pages during the course of randomly clicking on many other web pages over a period of time. Hence, these important time steps (i.e., the relevant web pages) in the sequential data contain more discriminative information for purchase prediction than the other time steps (i.e., the randomly viewed webpages). Similarly, in another example use case, a movie review can be composed as a long sentence in which only a few words of the sentence actually reflect the sentiment of the reviewer. Consider, for example, the sentence in FIG. 2. As will be appreciated in light of this disclosure, the event sequence in this use case is a sentence presenting a short movie review that includes a string of words. Just as with a series of web page clicks over a period of time where some clicks are more telling than other clicks, the same applies to the words in a given string. In the example case of FIG. 2, the words "entertaining movie" can clearly reveal that this is a positive review.

In more detail, according to an embodiment, a methodology implementing the techniques for generating and augmenting adversarial training data, for a deep learning network configured to perform event sequence analysis/classification, includes applying a long short-term memory (LSTM) attention model to an input data sequence (e.g., a sample of available training data) to identify discriminative sequence periods. For example, in the case where the data sequence is a string of words in a sentence, the discriminative sequence periods will be particular words or phrases which contain the most important or influential data for classification of the intent of the sentence. The method further includes generating attention weights associated with the discriminative sequence periods (words, in this example case), where the attention weights quantify the relative importance of the words making up the sentence. The method further includes generating perturbed data sequences based on the discriminative sequence periods (words) and the attention weights assigned to each of those words. For instance, continuing with the example of a data sequence in the form of a sentence, the perturbation would involve the substitution of alternate words or phrases for the discriminative sequence periods (i.e., the heavily-weighted words), such as "film" or "video" for "movie." This provides for augmented training data by adding more variability to the discriminative periods, which is equivalent to augmenting the training data by adding additional training sentences with different but similar discriminative words while maintaining the original meaning. Thus, the training data becomes more rich and deeper. In turn, this augmented training data improves the robustness of the deep learning network being trained against perturbations on these discriminative periods.

The method further includes applying either selective filtering techniques or conservative adversarial training techniques, as will be explained in greater detail below, to preserve the perceptual similarity between the input data sequence and the perturbed data sequence. That is to say, the general underlying meaning, intent, or data content of the sequence should not be substantially altered by the perturbation. So, for instance, in the context of words, the alternate words should be recognizable as synonyms or interchangeable with the original word, and the totality of individual perturbations should not change the overall meaning of the sentence. Failure to preserve such perceptual similarity is likely to result in significant changes to the sequential structure and the semantic meaning of the data, causing it to be unsuitable for effective training data augmentation.

Thus, the foregoing framework provides a system and methodology for training an analysis network to operate on sequential data with robustness in the face of adversarial perturbations. Numerous example configurations and variations will be apparent in light of this disclosure.

System Architecture

Figure 1:
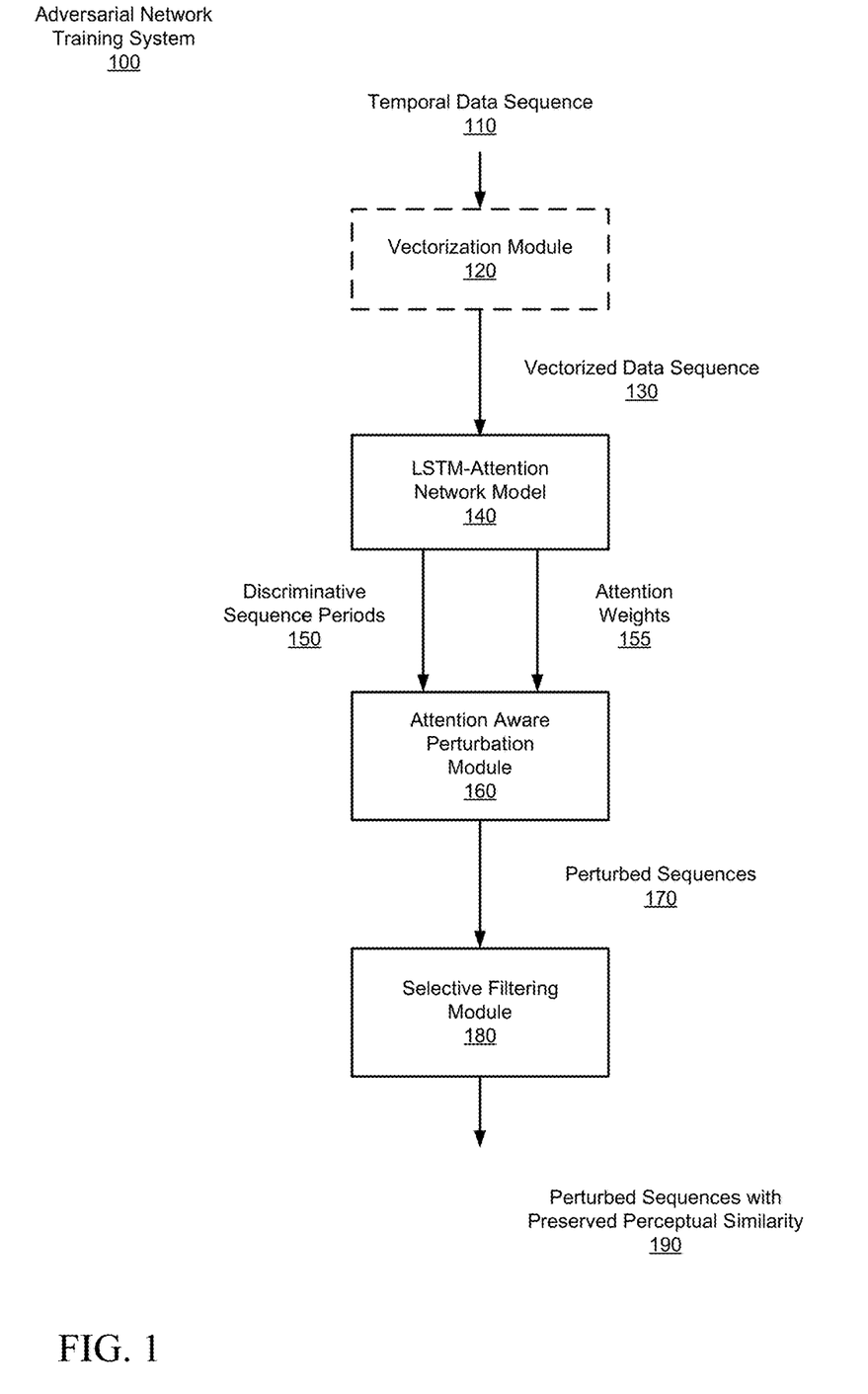
FIG. 1 is a block diagram of an adversarial network training system, configured in accordance with an embodiment of the present disclosure.

FIG. 1 is a block diagram of an adversarial network training system 100, configured in accordance with an embodiment of the present disclosure. The adversarial network training system 100 shown to include a vectorization module 120, long short-term memory (LSTM) attention network model 140, an attention aware perturbation module 160, and a selective filtering (SF) module 180.

Vectorization module 120, which may be optional in some embodiments, is configured to process a temporal input data stream 110 comprising words, symbols, webpage addresses, images, or other such data in any desired form, to generate a vectorized input data sequence 130 in a multidimensional numerical data sequence format. For example, if the temporal data sequence 110 is in the form of a sentence or sentences, the vectorization module 120 may employ any suitable and/or commercially available function (e.g., Word2Vec) to convert each word of the sentence into a data point in a multidimensional space, where similar words tend to cluster at relatively close distances within the multidimensional space, while dissimilar words lie at greater distances from each other. The vectorized input data sequence 130 thus comprises a sequence of vectors where each vector specifies a location in the multidimensional space for the corresponding data item in the temporal data sequence 110. This vectorized data sequence lends itself to further processing by the subsequent modules in the processing pipeline, as described below.

LSTM-attention network model 140 is configured to a identify discriminative sequence periods 150 of the input data sequence and to generate attention weights 155 associated with the discriminative sequence periods. Attention aware perturbation module 160 is configured to add adversarial perturbations to the input data sequence to generate one or more perturbed data sequences 170 based on the discriminative sequence periods 150 and the attention weights 155. The operations of LSTM-attention network model 140 and attention aware perturbation module 160 will be described in greater detail below in connection with FIGS. 3 and 4 respectively.

Because adversarial perturbations are added at multiple time steps, it is possible that these perturbations can combine to result in a severe impact (e.g., undesirable changes in meaning) to the discriminative sequential patterns. To address this problem, selective filtering (SF) module 180 is configured to preserve perceptual similarity between the input data sequence 130 and the resulting perturbed data sequences 190 which are provided as output. The operation of SF module 180 will be described in greater detail below in connection with FIG. 5.

Figure 2:
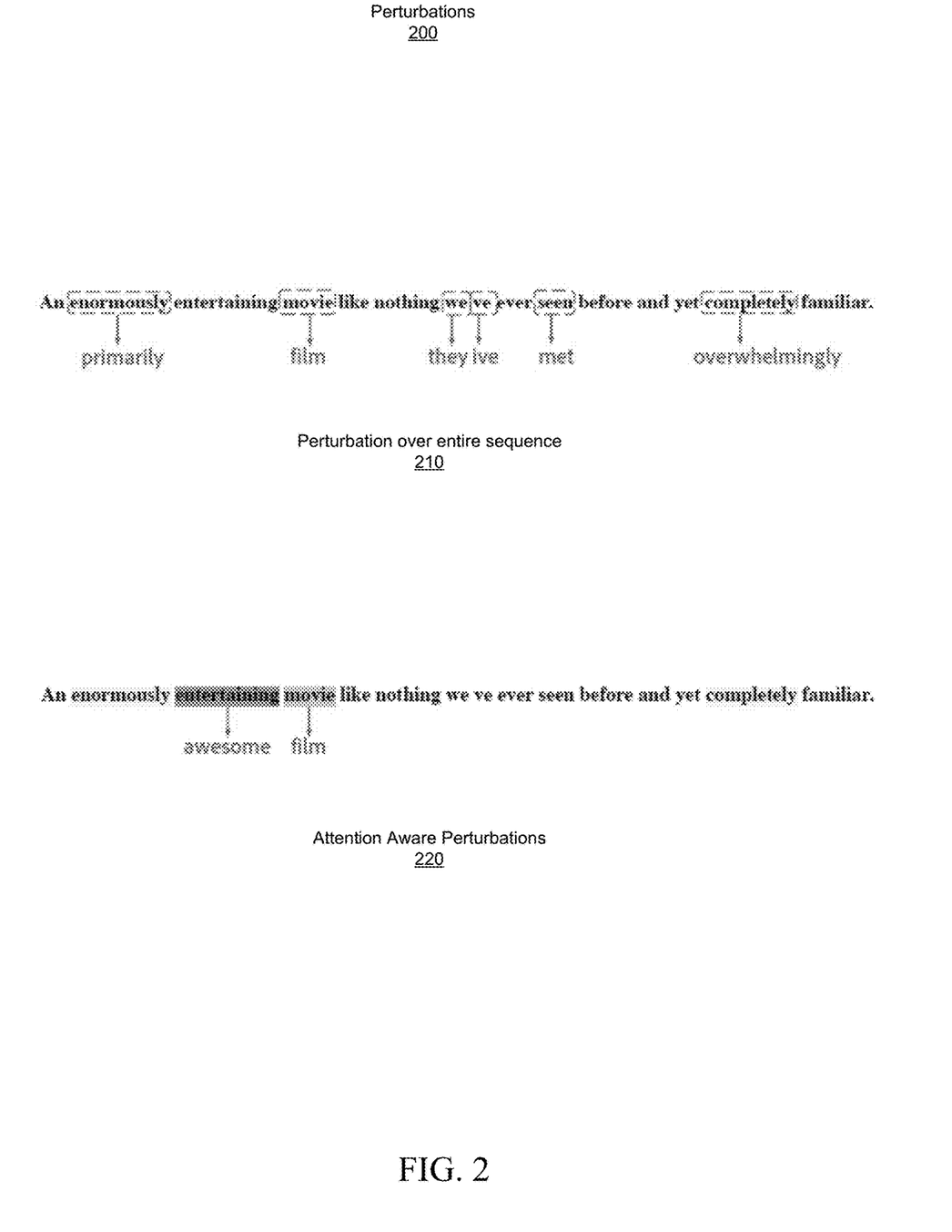
FIG. 2 illustrates examples of perturbations of an event sequence, in accordance with an embodiment of the present disclosure.

FIG. 2 illustrates an example of perturbations of an event sequence 200, in accordance with an embodiment of the present disclosure. The event sequence in this case is a sentence presenting a short movie review comprising the string of words:

"An enormously entertaining movie like nothing we've ever seen before and yet completely familiar."

In the first example 210, adversarial perturbations are generated over the entire sequence, resulting in the following substitutions:

"enormously"→"primarily",
"movie"→"film",
"we've"→"they've",
"seen"→"met", and
"completely"→"overwhelmingly".

In the second example 220, attention aware perturbations are made to only the most discriminative words "entertaining" and "movie," resulting in the following substitutions:

"entertaining"→"awesome", and
"movie"→"film".

The word "entertaining" had an attention score of 0.62 and the word "movie" had an attention score of 00.12, while the remaining words of the sentence had attention scores of 0.1 or less. The attention aware perturbations 220 are generally more useful as training sequences than the perturbations applied over the entire sequence 210.

Figure 3:
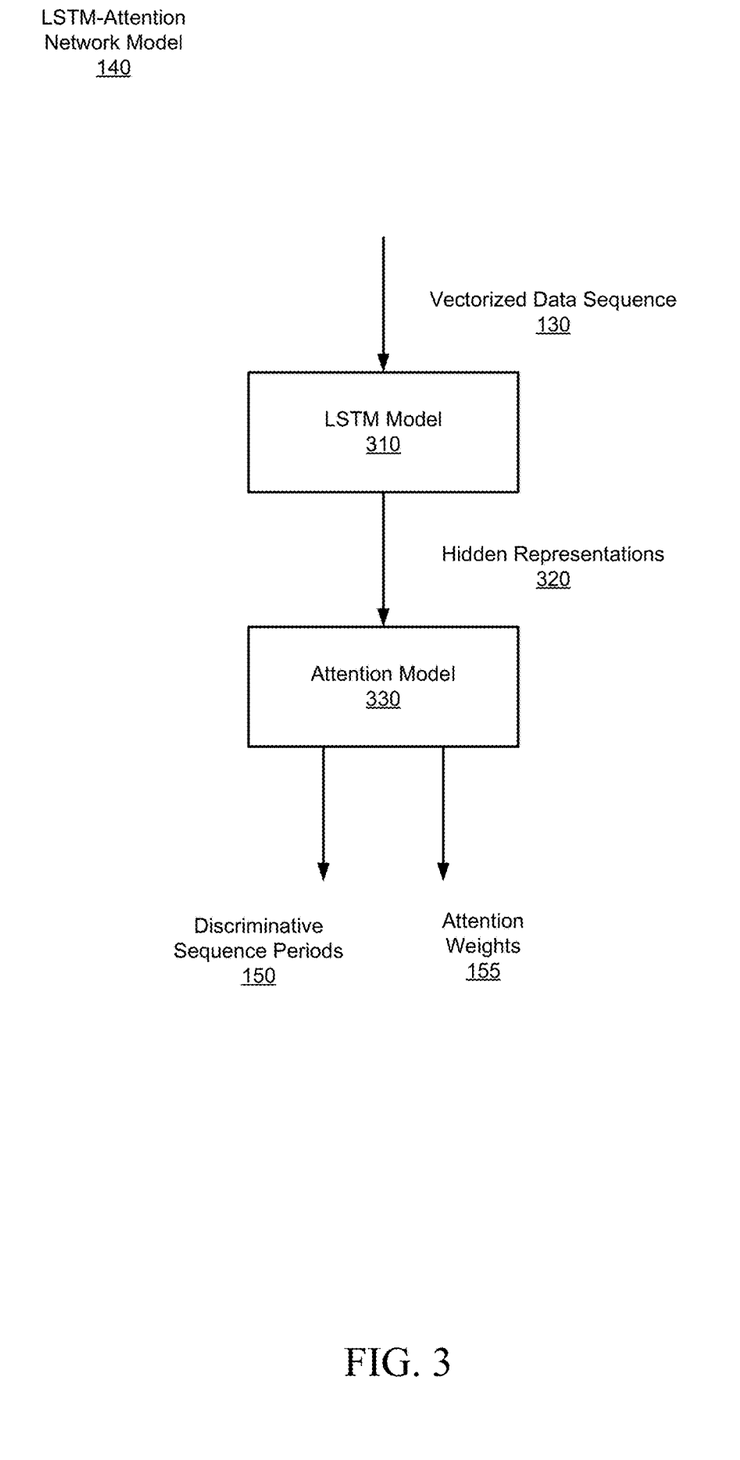
FIG. 3 is a block diagram of a long short-term memory (LSTM) attention model, configured in accordance with an embodiment of the present disclosure.

FIG. 3 is a block diagram of the LSTM-attention network model 140, configured in accordance with an embodiment of the present disclosure. The LSTM-attention network model 140 is shown to include an LSTM model 310 and an attention model 330.

LSTM model 310 is configured to detect discriminative periods from the data sequence and discover the representative temporal patterns for classification to generate hidden representations of the data sequence at each time step. The attention model 330 is configured to combine the hidden representations at different time steps to assign attention weights to those time steps, wherein higher attention weights at a given time step indicate more expressed discriminative knowledge at that time step. The LSTM-attention network model 140 may be implemented using known techniques in light of the present disclosure.

Figure 4:
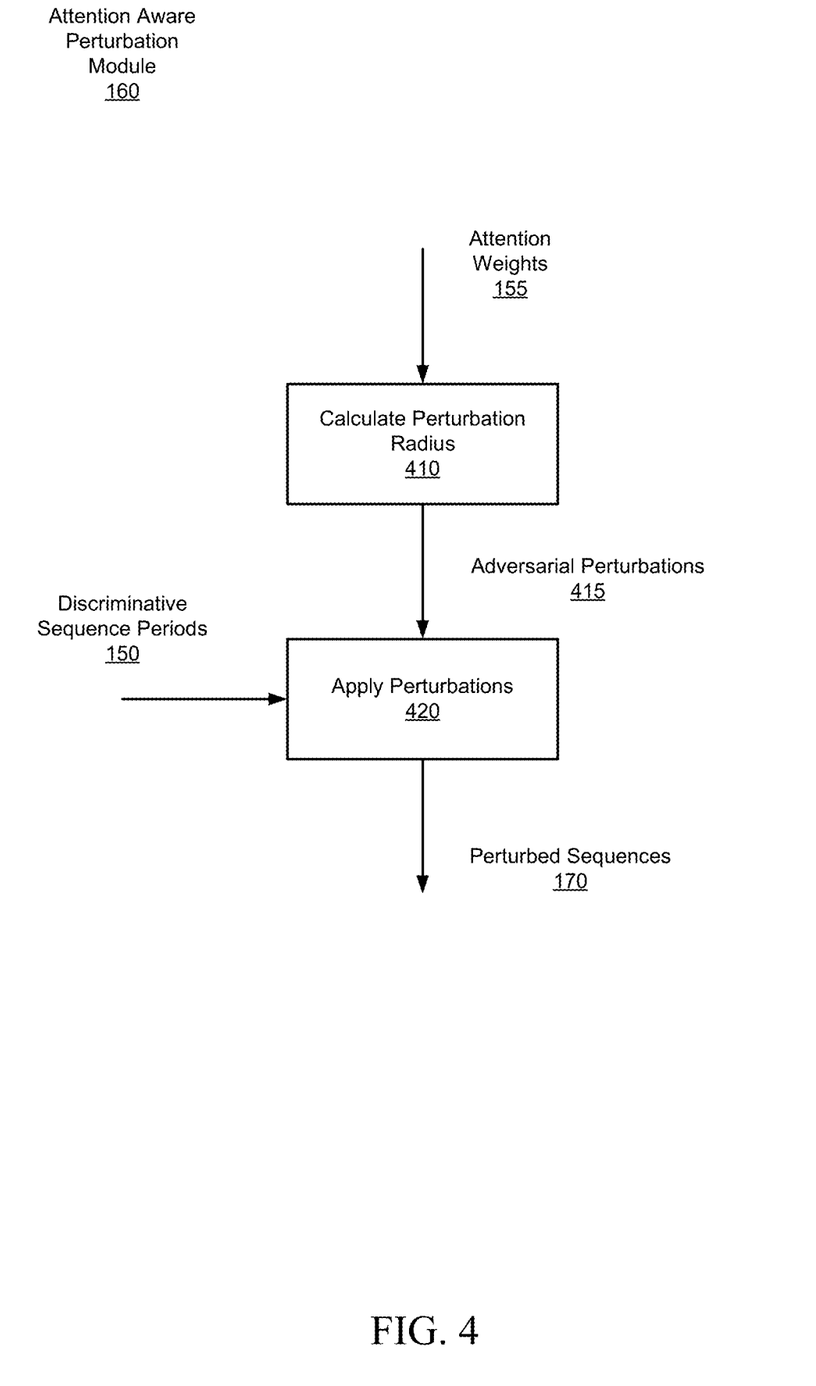
FIG. 4 is a block diagram of an attention aware perturbation module, configured in accordance with an embodiment of the present disclosure.

FIG. 4 is a block diagram of the attention aware perturbation module 160, configured in accordance with an embodiment of the present disclosure. The attention aware perturbation module 160 is shown to include a perturbation radius calculation module 410 and a perturbation application module 420. Having employed the LSTM-attention network 140 to detect the discriminative periods 150, the attention aware perturbation module 160 adds adversarial perturbations to enrich the training data with more variability within those discriminative periods. In this way, a model trained with such data will be more robust against any slight perturbations to the discriminative patterns in the sequence. Specifically, given the attention weights 155 and the hidden representation learned from the LSTM-attention network 140, adversarial perturbations of larger magnitude are applied to more discriminative periods.

Perturbation radius calculation module 410 is configured to calculate an adversarial perturbation radius based on the attention weights 155 and to generate adversarial perturbations 415 within the adversarial perturbation radius. In some embodiments, this can be expressed as a mini-max problem over time steps t by the following equation (which can be solved using known techniques in light of the present disclosure):

$$\min_{\theta} L_{att}(x, y; \theta) + \lambda L_{att}(x + r_{adv}, y; \theta)$$

$$r_{adv} = \text{argmax}_r L_{att}(x + r, y; \theta),$$

$$\text{such that } \|r^t\| < \alpha^t \epsilon, \text{ for } t = 1 \text{ to } T,$$

where x is the input data, y represents the training labels or ground truth associated with the input data x, θ are the model parameters to reduce training loss, λ is a parameter to control balance between the adversarial training loss $L_{att}$ and the standard training loss, $r_{adv}$ is the adversarial perturbation, $a^t$ is the attention weight at time step t, and c is a selected scale factor to control the perturbation radius. From these equations, it can be seen that the allowed perturbation radius $\|r^t\|$ is larger for the time steps with higher attention weights.

This method can also be extended to unlabeled data. Since the learning model can detect discriminative periods without requiring training labels, virtual adversarial training based perturbations (using predicted labels instead of ground truth labels) can be added to the detected discriminative periods.

Perturbation application module 420 is configured to apply the adversarial perturbations $r_{adv}$ 415 to the discriminative sequence periods 150 of the input data sequence to generate potential perturbed data sequences 170.

Figure 5:
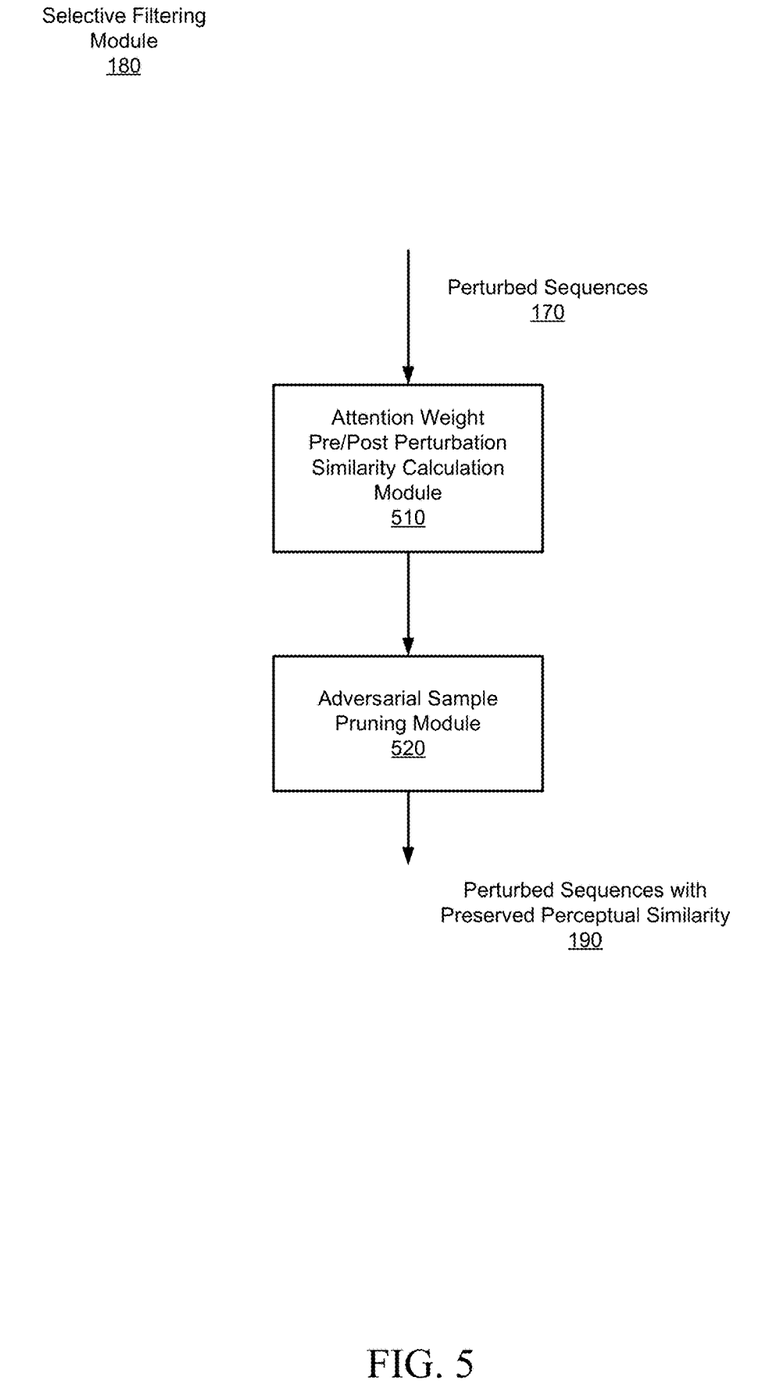
FIG. 5 is a block diagram of a selective filtering module, configured in accordance with an embodiment of the present disclosure.

FIG. 5 is a block diagram of the selective filtering module 180, configured in accordance with an embodiment of the present disclosure, to remove adversarial samples that lead to large variations of the attention weights. The SF module 180 is shown to include an attention weight pre/post perturbation similarity calculation module 510 and an adversarial sample pruning module 520.

Attention weight pre/post perturbation similarity calculation module 510 is configured to calculate a sum of products of (1) the attention weights of the input data sequence and (2) a logarithm of attention weights of the potential perturbed data sequence. In some embodiments, this can be expressed by the following equation:

$$R = \sum_t \alpha^t \log(\alpha^t_{adv})$$

where R is a measure of the similarity of the attention weights $a^t$ and $a_{adv}{}^t$, before and after the adversarial perturbation. A large value of R indicates that the perturbed sequence maintains a relatively high perceptual similarity to the original sequence.

Adversarial sample pruning module 520 is configured to rank the potential perturbed data sequence among one or more additional potential perturbed data sequences, the ranking based on the measure of perceptual similarity. Said differently, adversarial sample pruning module 520 is configured to select adversarial samples within the top K % of R values for adversarial training, where K is a heuristically chosen threshold.

Figure 6:
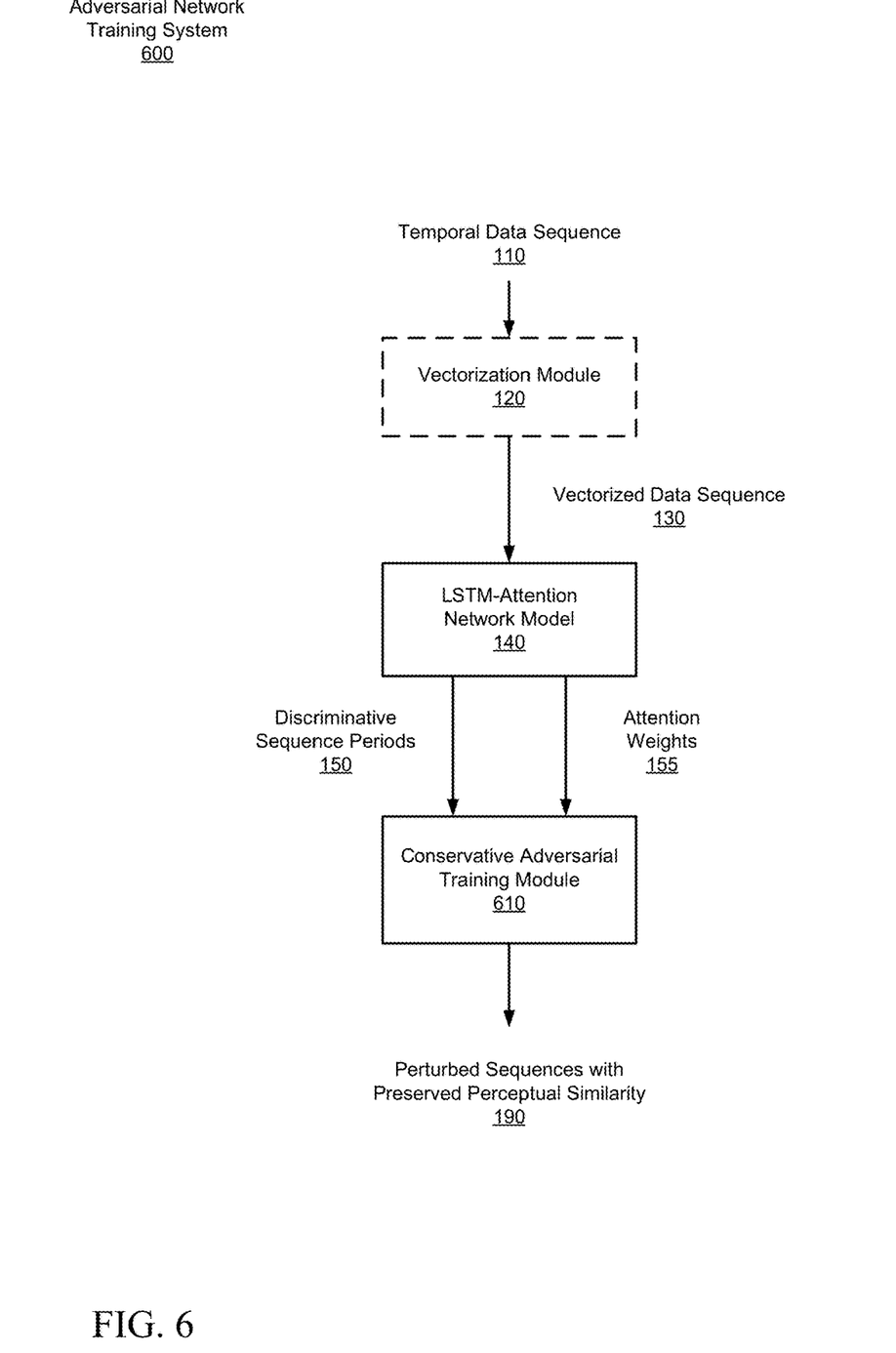
FIG. 6 is a block diagram of an adversarial network training system, configured in accordance with another embodiment of the present disclosure.

FIG. 6 is a block diagram of an adversarial network training system 600, configured in accordance with another embodiment of the present disclosure. The adversarial network training system 600 shown to include vectorization module 120, LSTM-attention network model 140, and a conservative adversarial training (CAT) module 610, which is provided in this embodiment as an alternative to selective filtering.

Vectorization module 120 is configured to process a temporal input data stream 110 comprising words, symbols, webpage addresses, images, or other such data in any desired form, to generate a vectorized input data sequence 130 in a multidimensional numerical data sequence format, as previously described.

LSTM-attention network model 140 is configured to is configured to generate discriminative sequence periods 150 and attention weights 155 associated with the discriminative sequence periods, as previously described.

Conservative adversarial training (CAT) module 610 is configured to preserve perceptual similarity between the input data sequence and the perturbed data sequence, as an alternative to selective filtering. Rather than filtering all the generated perturbations, as in the SF approach, CAT generates perturbations $r_{adv}$ that maintain the perceptual similarity to start with, so that no further filtering is required.

Figure 7:
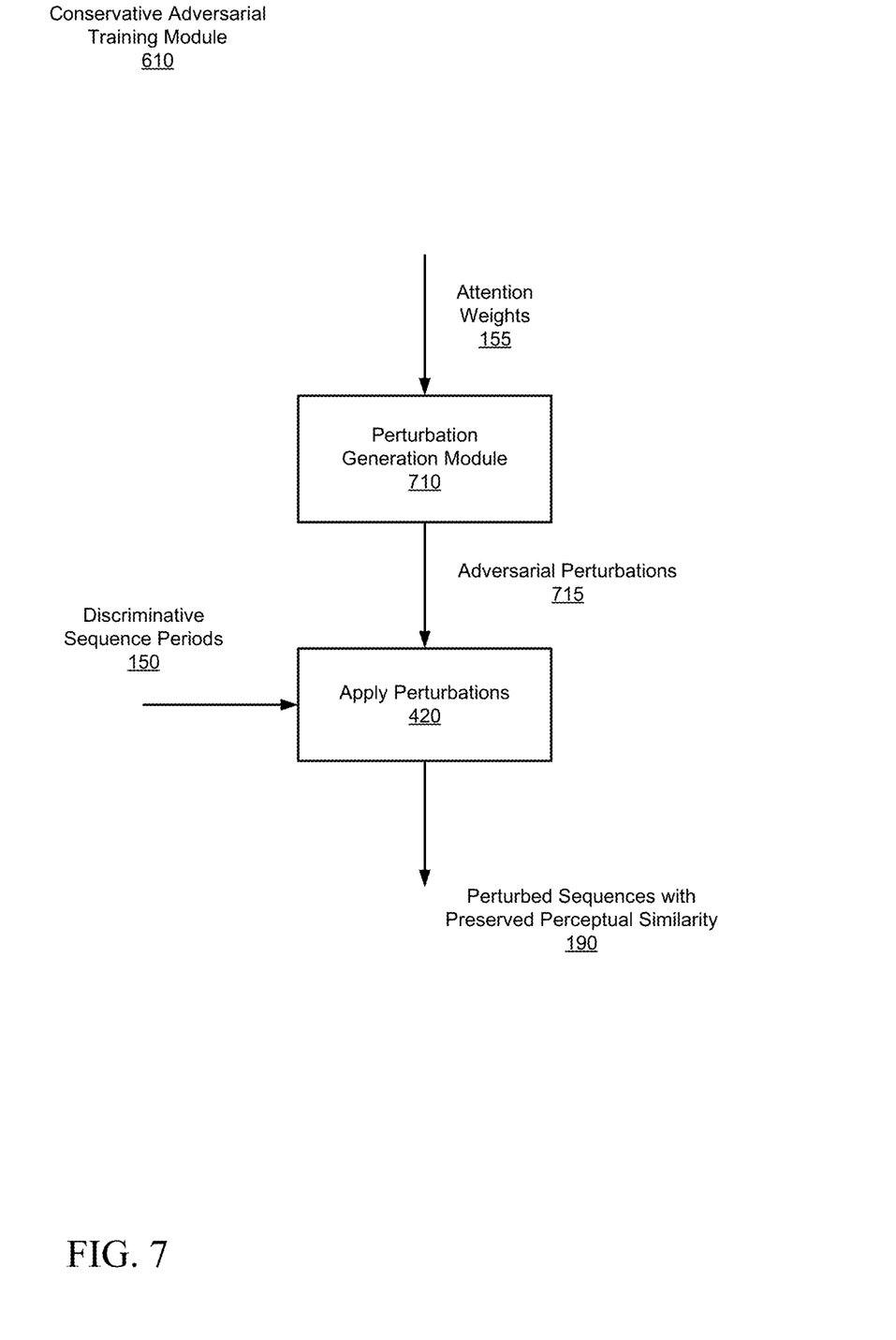
FIG. 7 is a block diagram of a conservative adversarial training module, configured in accordance with another embodiment of the present disclosure.

FIG. 7 is a block diagram of the conservative adversarial training module 610, configured in accordance with another embodiment of the present disclosure. CAT module 610 is shown to include a perturbation generation module 710, and perturbation application module 420.

Perturbation generation module 710 is configured to generate adversarial perturbations $r_{adv}$ 715 which maximize an adversarial loss while minimizing variation of the attention weights, such that the perturbations maintain the perceptual similarity with the input data sequence, and thus require no additional filtering. In some embodiments, this may be expressed as a maximization problem by the following equation (which can be solved using known techniques in light of the present disclosure):

$$r_{adv} = \text{argmax}_r L(x+r, y; \theta) + \gamma R$$

$$s.t. \|r^t\| < \alpha^t \epsilon, \text{ for } t=1 \text{ to } T$$

where x is the input data, y represents the training labels or ground truth associated with the input data x, θ are the model parameters to reduce training loss, R is the measure of the similarity of the attention weights $\alpha^t$ and $\alpha_{adv}^t$ before and after the adversarial perturbation (as described previously), γ is a parameter to control balance between maximizing the training loss and maintaining perceptual similarity, $r_{adv}$ is the adversarial perturbation, and ∈ is a selected scale factor to control the maximization.

Perturbation application module 420 is configured to apply the CAT generated adversarial perturbations $r_{adv}$ 715 to the discriminative sequence periods 150 of the input data sequence to generate perturbed data sequences with preserved perceptual similarity 190.

Methodology

Figure 8:
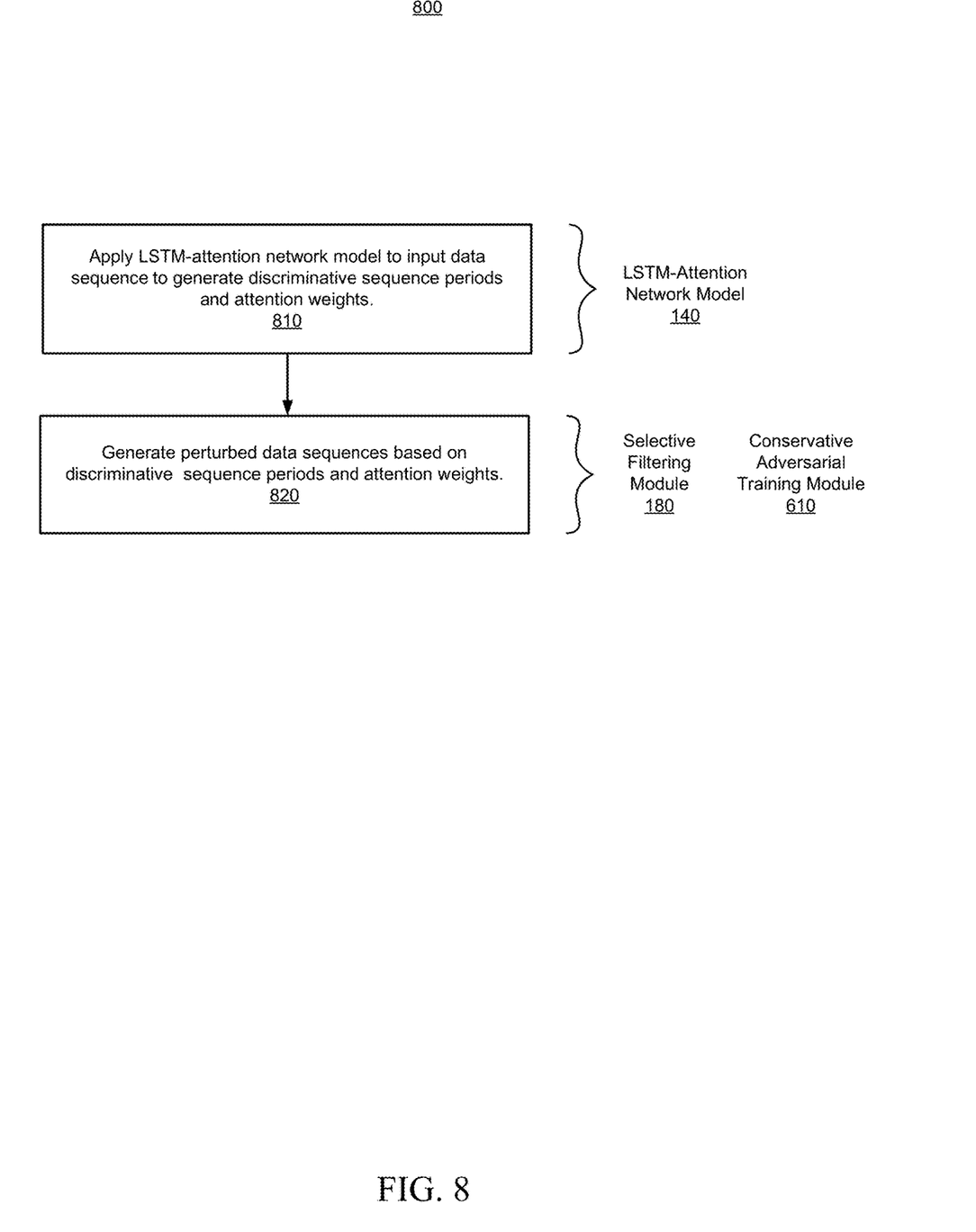
FIG. 8 is a flowchart illustrating a method for adversarial training sequence perturbation, in accordance with an embodiment of the present disclosure.

FIG. 8 is a flowchart 800 illustrating a method for adversarial training sequence perturbation, in accordance with an embodiment of the present disclosure. As can be seen, the method is described with reference to the configuration of adversarial network training systems 100 and 600 of FIGS. 1 and 6, and the components thereof from FIGS. 3-5 and 7. However, any number of module configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration.

The method commences, at operation 810, by applying a long short-term memory attention model to an input data sequence to generate discriminative sequence periods and attention weights associated with the discriminative sequence periods. The attention weights are generated to indicate the relative importance of data in those discriminative sequence periods.

The method continues, at operation 820, by generating perturbed data sequences based on the discriminative sequence periods and the attention weights. The generation of the perturbed data sequences employs at least one of selective filtering or conservative adversarial training. The selective filtering and conservative adversarial training is employed to preserve perceptual similarity between the input data sequence and the perturbed data sequences.

In some embodiments, additional operations are performed. For example, in one embodiment, selective filtering calculates an adversarial perturbation radius based on the attention weights, calculates adversarial perturbations within the adversarial perturbation radius, and applies the adversarial perturbations to the input data sequence to generate a potential perturbed data sequence. Selective filtering then calculates a measure of perceptual similarity between the input data sequence and the potential perturbed data sequence based on a sum of products of (1) the attention weights of the input data sequence and (2) a logarithm of attention weights of the potential perturbed data sequence and ranks the potential perturbed data sequence among one or more additional potential perturbed data sequences based on the measure of perceptual similarity, as previously described.

In another embodiment, conservative adversarial training generates adversarial perturbations to maximize an adversarial loss while minimizing variation of the attention weights, as described previously.

In some embodiments, the input data sequence may be created by vectorizing a temporal input data stream comprising words, symbols, and the like, into a multidimensional vectorized numerical data sequence format. Additionally, in some embodiments, training may be performed on an adversarial deep learning network for event sequence analysis, the training employing the perturbed data sequences as training data.

Example Platform

Figure 9:
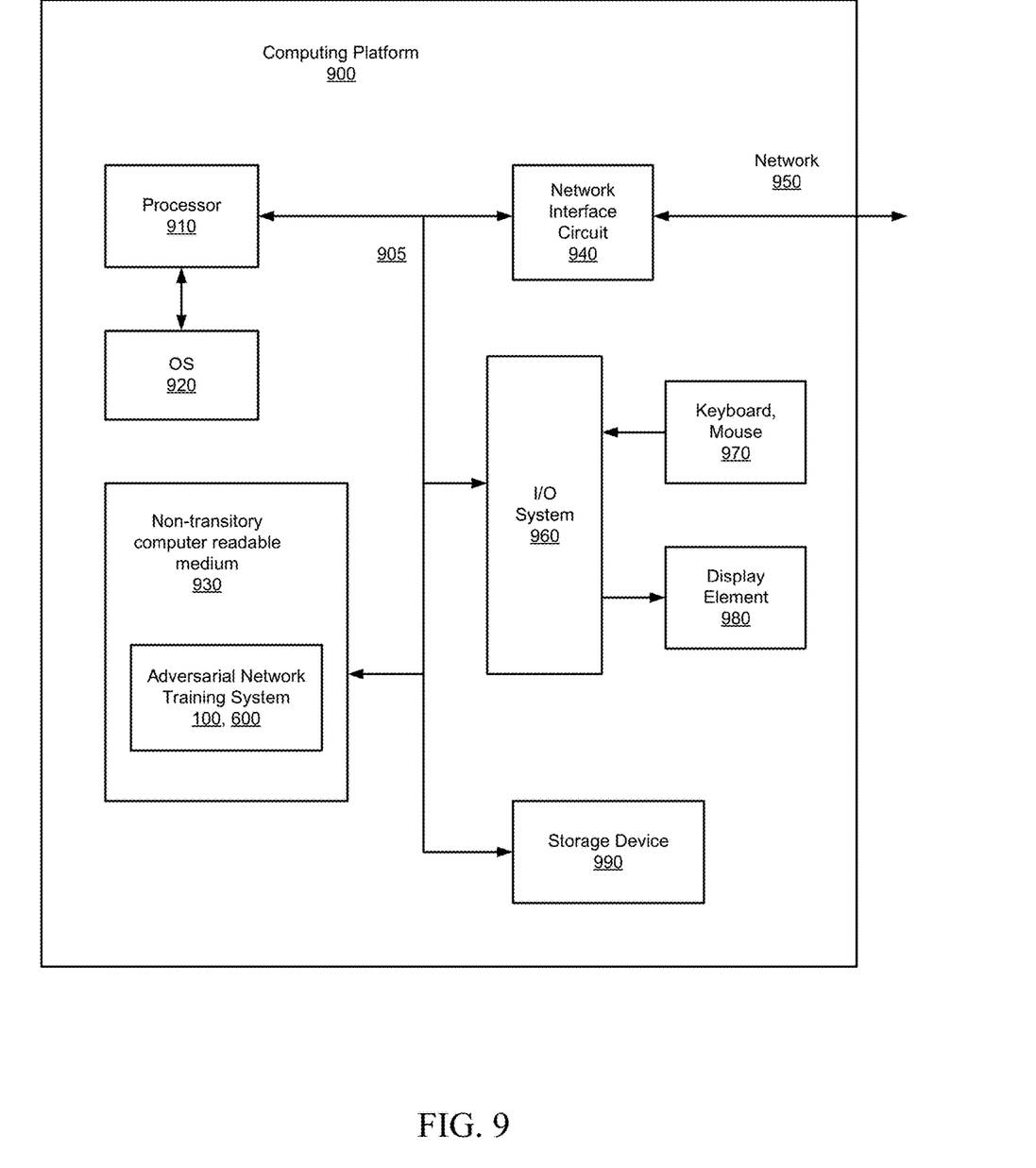
FIG. 9 is a block diagram schematically illustrating a computing platform configured to perform any of the techniques as variously described in this disclosure, configured in accordance with an embodiment of the present disclosure.

FIG. 9 is a block diagram schematically illustrating a computing platform 900 configured to perform any of the techniques as variously described in this disclosure, configured in accordance with an embodiment of the present disclosure. For example, in some embodiments, the adversarial network training systems 100 and 600 of FIGS. 1 and 6, or any portions thereof as illustrated in FIGS. 3-5 and 7, and the methodologies of FIG. 8, or any portions thereof, are implemented in the computing platform 900. In some embodiments, the computing platform 900 is a computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing or telecommunications device that has sufficient processor power and memory capacity to perform the operations described in this disclosure. In some embodiments, a distributed computational system is provided comprising a plurality of such computing devices.

The computing platform 900 includes one or more storage devices 990 and/or non-transitory computer-readable media 930 having encoded thereon one or more computer-executable instructions or software for implementing techniques as variously described in this disclosure. In some embodiments, the storage devices 990 include a computer system memory or random access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device 990 includes other types of memory as well, or combinations thereof. In one embodiment, the storage device 990 is provided on the computing platform 900. In another embodiment, the storage device 990 is provided separately or remotely from the computing platform 900. The non-transitory computer-readable media 930 include, but are not limited to, one or more types of hardware memory, non-transitory tangible media (for example, one or more magnetic storage disks, one or more optical disks, one or more USB flash drives), and the like. In some embodiments, the non-transitory computer-readable media 930 included in the computing platform 900 store computer-readable and computer-executable instructions or software for implementing various embodiments. In one embodiment, the computer-readable media 930 are provided on the computing platform 900. In another embodiment, the computer-readable media 930 are provided separately or remotely from the computing platform 900.

The computing platform 900 also includes at least one processor 910 for executing computer-readable and computer-executable instructions or software stored in the storage device 990 and/or non-transitory computer-readable media 930 and other programs for controlling system hardware. In some embodiments, virtualization is employed in the computing platform 900 so that infrastructure and resources in the computing platform 900 are shared dynamically. For example, a virtual machine is provided to handle a process running on multiple processors so that the process appears to be using only one computing resource rather than multiple computing resources. In some embodiments, multiple virtual machines are used with one processor.

As can be further seen, a bus or interconnect 905 is also provided to allow for communication between the various components listed above and/or other components not shown. Computing platform 900 can be coupled to a network 950 (e.g., a local or wide area network such as the internet), through network interface circuit 940 to allow for communications with other computing devices, platforms, resources, clients, and Internet of Things (IoT) devices.

In some embodiments, a user interacts with the computing platform 900 through an input/output system 960 that interfaces with devices such as a keyboard and mouse 970 and/or a display element (screen/monitor) 980. The keyboard and mouse may be configured to provide a user interface to accept user input and guidance, for example to select data for processing by the system, and to otherwise control the adversarial training process. The display element may be configured, for example, to display the results of processing using the disclosed techniques. In some embodiments, the computing platform 900 includes other I/O devices (not shown) for receiving input from a user, for example, a pointing device or a touchpad, etc., or any suitable user interface. In some embodiments, the computing platform 900 includes other suitable conventional I/O peripherals. The computing platform 900 can include and/or be operatively coupled to various suitable devices for performing one or more of the aspects as variously described in this disclosure.

In some embodiments, the computing platform 900 runs an operating system (OS) 920, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing platform 900 and performing the operations described in this disclosure. In one embodiment, the operating system runs on one or more cloud machine instances.

As will be appreciated in light of this disclosure, the various modules and components of the system, as shown in FIGS. 1 and 7-10, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the computing system, as described in this disclosure, can be performed by similar processors in different configurations and arrangements, and that the depicted embodiments are not intended to be limiting. Various components of this example embodiment, including the computing platform 900, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a touch pad, a touch screen, etc., are not shown but will be readily apparent.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

Further Example Embodiments

Numerous example embodiments will be apparent, and features described herein can be combined in any number of configurations.

Example 1 is a method for adversarial training sequence perturbation, the method comprising: applying, by a processor-based system, a long short-term memory attention model to an input data sequence to identify discriminative sequence periods of the input data sequence and to generate attention weights associated with the discriminative sequence periods; and generating, by the processor-based system, a perturbed data sequence based on the discriminative sequence periods and the attention weights, the generation employing at least one of selective filtering or conservative adversarial training, the selective filtering and conservative adversarial training to preserve perceptual similarity between the input data sequence and the perturbed data sequence.

Example 2 includes the subject matter of Example 1, wherein the generation of the perturbed data sequence comprises calculating an adversarial perturbation radius based on the attention weights, calculating adversarial perturbations within the adversarial perturbation radius, and applying the adversarial perturbations to the discriminative sequence periods of the input data sequence to generate a potential perturbed data sequence.

Example 3 includes the subject matter of Examples 1 or 2, wherein the selective filtering comprises calculating a measure of perceptual similarity between the input data sequence and the potential perturbed data sequence based on a sum of products of (1) the attention weights of the input data sequence and (2) a logarithm of attention weights of the potential perturbed data sequence.

Example 4 includes the subject matter of any of Examples 1-3, wherein the selective filtering further comprises ranking the potential perturbed data sequence among one or more additional potential perturbed data sequences, the ranking based on the measure of perceptual similarity.

Example 5 includes the subject matter of any of Examples 1-4, wherein the conservative adversarial training comprises generating adversarial perturbations to maximize an adversarial loss and minimize variation of the attention weights.

Example 6 includes the subject matter of any of Examples 1-5, further comprising vectorizing an input temporal data stream to generate the input data sequence.

Example 7 includes the subject matter of any of Examples 1-6, further comprising training an adversarial deep learning network for event sequence analysis, the training employing a plurality of the perturbed data sequences as training data.

Example 8 is a system for adversarial training sequence perturbation, the system comprising: one or more processors to control and/or execute a long short-term memory attention model configured to process an input data sequence and identify discriminative sequence periods of the input data sequence and to generate attention weights associated with the discriminative sequence periods; and the one or more processors further to control and/or execute an attention aware perturbation module configured to generate a perturbed data sequence based on the discriminative sequence periods and the attention weights.

Example 9 includes the subject matter of Example 8, further comprising a selective filtering module, controllable and/or executable by the one or more processors, and configured to preserve perceptual similarity between the input data sequence and the perturbed data sequence.

Example 10 includes the subject matter of Examples 8 or 9, wherein the selective filtering module is further configured to calculate an adversarial perturbation radius based on the attention weights, calculate adversarial perturbations within the adversarial perturbation radius, and apply the adversarial perturbations to the discriminative sequence periods of the input data sequence to generate a potential perturbed data sequence.

Example 11 includes the subject matter of any of Examples 8-10, wherein the selective filtering module is further configured to calculate a measure of perceptual similarity between the input data sequence and the potential perturbed data sequence based on a sum of products of (1) the attention weights of the input data sequence and (2) a logarithm of attention weights of the potential perturbed data sequence.

Example 12 includes the subject matter of any of Examples 8-11, wherein the selective filtering module is further configured to rank the potential perturbed data sequence among one or more additional potential perturbed data sequences, the ranking based on the measure of perceptual similarity.

Example 13 includes the subject matter of any of Examples 8-12, further comprising a conservative adversarial training module, controllable and/or executable by the one or more processors, and configured to generate adversarial perturbations to maximize an adversarial loss and minimize variation of the attention weights.

Example 14 is a computer program product including one or more non-transitory machine-readable mediums encoded with instructions that when executed by one or more processors cause a process to be carried out for adversarial training sequence perturbation, the process comprising: applying a long short-term memory attention model to an input data sequence to identify discriminative sequence periods of the input data sequence and to generate attention weights associated with the discriminative sequence periods; and generating a perturbed data sequence based on the discriminative sequence periods and the attention weights, the generation employing at least one of selective filtering or conservative adversarial training, the selective filtering and conservative adversarial training to preserve perceptual similarity between the input data sequence and the perturbed data sequence.

Example 15 includes the subject matter of Example 14, wherein the generation of the perturbed data sequence comprises calculating an adversarial perturbation radius based on the attention weights, calculating adversarial perturbations within the adversarial perturbation radius, and applying the adversarial perturbations to the discriminative sequence periods of the input data sequence to generate a potential perturbed data sequence.

Example 16 includes the subject matter of Examples 14 or 15, wherein the selective filtering comprises calculating a measure of perceptual similarity between the input data sequence and the potential perturbed data sequence based on a sum of products of (1) the attention weights of the input data sequence and (2) a logarithm of attention weights of the potential perturbed data sequence.

Example 17 includes the subject matter of any of Examples 14-16, wherein the selective filtering further comprises ranking the potential perturbed data sequence among one or more additional potential perturbed data sequences, the ranking based on the measure of perceptual similarity.

Example 18 includes the subject matter of any of Examples 14-17, wherein the conservative adversarial training comprises generating adversarial perturbations to maximize an adversarial loss and minimize variation of the attention weights.

Example 19 includes the subject matter of any of Examples 14-18, further comprising vectorizing an input temporal data stream to generate the input data sequence.

Example 20 includes the subject matter of any of Examples 14-19, further comprising training an adversarial deep learning network for event sequence analysis, the training employing a plurality of the perturbed data sequences as training data.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method for adversarial training sequence perturbation, the method comprising:
    applying, by a processor-based system, a long short-term memory attention model to an input data sequence to identify discriminative sequence periods of the input data sequence and to generate a corresponding attention weight value for each one of at least some of the discriminative sequence periods;
    calculating, by the processor-based system, a first adversarial perturbation radius for a first one of the discriminative sequence periods, wherein the first adversarial perturbation radius is a product of a scale factor and a first attention weight value corresponding to the first discriminative sequence period;
    calculating a second adversarial perturbation radius for a second one of the discriminative sequence periods, wherein the second adversarial perturbation radius is a product of the scale factor and a second attention weight value corresponding to the second discriminative sequence period;
    generating, by the processor-based system, a perturbed data sequence by (a) replacing data in the first discriminative sequence period with first adversarial perturbed data that falls within the first adversarial perturbation radius and (b) replacing data in the second discriminative sequence period with second adversarial perturbed data that falls within the second adversarial perturbation radius, wherein generating the perturbed data sequence employs at least one of selective filtering or conservative adversarial training, the selective filtering and the conservative adversarial training to preserve perceptual similarity between the input data sequence and the perturbed data sequence; and
    using training data that includes the perturbed data sequence to train an adversarial deep learning network for event sequence analysis.

2. The method of claim 1, further comprising generating the first adversarial perturbed data using a predicted training label associated with the input data sequence.

3. The method of claim 2, wherein the selective filtering comprises calculating a measure of perceptual similarity between the input data sequence and the perturbed data sequence based on a sum of products of (1) the attention weight values of the discriminative sequence periods of the input data sequence and (2) a logarithm of attention weights of the perturbed data sequence.

4. The method of claim 3, wherein the selective filtering further comprises ranking the perturbed data sequence among one or more potential perturbed data sequences, the ranking based on the measure of perceptual similarity.

5. The method of claim 1, wherein the conservative adversarial training comprises generating adversarial perturbations to maximize an adversarial loss and minimize variation of the attention weight values of the discriminative sequence periods of the input data sequence.

6. The method of claim 1, further comprising vectorizing an input temporal data stream to generate the input data sequence.

7. The method of claim 1, further comprising generating a plurality of perturbed data sequences, wherein the training data includes the plurality of perturbed data sequences.

8. A system for adversarial training sequence perturbation, the system comprising:
one or more processors to control and/or execute a long short-term memory attention model configured to process an input data sequence and identify discriminative sequence periods of the input data sequence and to generate a corresponding attention weight value for each one of at least some of the discriminative sequence periods;
the one or more processors further to control and/or execute a selective filtering module configured to
calculate a first adversarial perturbation radius for a first one of the discriminative sequence periods, wherein the first adversarial perturbation radius is a product of a scale factor and a first attention weight value corresponding to the first discriminative sequence period, and
calculate a second adversarial perturbation radius for a second one of the discriminative sequence periods, wherein the second adversarial perturbation radius is a product of the scale factor and a second attention weight value corresponding to the second discriminative sequence period; and
the one or more processors further to control and/or execute an attention aware perturbation module configured to generate a perturbed data sequence by (a) replacing data in the first discriminative sequence period with first adversarial perturbed data that falls within the first adversarial perturbation radius and (b) replacing data in the second discriminative sequence period with second adversarial perturbed data that falls within the second adversarial perturbation radius; and
the one or more processors further to control and/or execute using training data that includes the perturbed data sequence to train an adversarial deep learning network for event sequence analysis.

9. The system of claim 8, wherein the selective filtering module is further configured to preserve perceptual similarity between the input data sequence and the perturbed data sequence.

10. The system of claim 9, wherein the selective filtering module is further configured to generate the first adversarial perturbed data using a predicted training label associated with the input data sequence.

11. The system of claim 10, wherein the selective filtering module is further configured to calculate a measure of perceptual similarity between the input data sequence and the perturbed data sequence based on a sum of products of (1) the attention weight values of the discriminative sequence periods of the input data sequence and (2) a logarithm of attention weights of the perturbed data sequence.

12. The system of claim 11, wherein the selective filtering module is further configured to rank the perturbed data sequence among one or more additional perturbed data sequences, the ranking based on the measure of perceptual similarity.

13. The system of claim 8, further comprising a conservative adversarial training module, controllable and/or executable by the one or more processors, and configured to generate adversarial perturbations to maximize an adversarial loss and minimize variation of the attention weight values of the discriminative sequence periods of the input data sequence.

14. A computer program product including one or more non-transitory machine-readable mediums encoded with instructions that when executed by one or more processors cause a process to be carried out for adversarial training sequence perturbation, the process comprising:
applying a long short-term memory attention model to an input data sequence to identify discriminative sequence periods of the input data sequence and to generate a corresponding attention weight value for each one of at least some of the discriminative sequence periods;
calculating a first adversarial perturbation radius for a first one of the discriminative sequence periods, wherein the first adversarial perturbation radius is a product of a scale factor and a first attention weight value corresponding to the first discriminative sequence period;
calculating a second adversarial perturbation radius for a second one of the discriminative sequence periods, wherein the second adversarial perturbation radius is a product of the scale factor and a second attention weight value corresponding to the second discriminative sequence period;
generating a perturbed data sequence by (a) replacing data in the first discriminative sequence period with first adversarial perturbed data that falls within the first adversarial perturbation radius and (b) replacing data in the second discriminative sequence period with second adversarial perturbed data that falls within the second adversarial perturbation radius, wherein generating the perturbed data sequence employs at least one of selective filtering or conservative adversarial training, the selective filtering and the conservative adversarial training to preserve perceptual similarity between the input data sequence and the perturbed data sequence; and
using training data that includes the perturbed data sequence to train an adversarial deep learning network for event sequence analysis.

15. The computer program product of claim 14, the process further comprising generating the first adversarial perturbed data using a predicted training label associated with the input data sequence.

16. The computer program product of claim 15, wherein the selective filtering comprises calculating a measure of perceptual similarity between the input data sequence and the perturbed data sequence based on a sum of products of (1) the attention weight values of the discriminative sequence periods of the input data sequence and (2) a logarithm of attention weights of the perturbed data sequence.

17. The computer program product of claim 16, wherein the selective filtering further comprises ranking the perturbed data sequence among one or more additional perturbed data sequences, the ranking based on the measure of perceptual similarity.

18. The computer program product of claim 14, wherein the conservative adversarial training comprises generating adversarial perturbations to maximize an adversarial loss and minimize variation of the attention weight values of the discriminative sequence periods of the input data sequence.

19. The computer program product of claim 14, the process further comprising vectorizing an input temporal data stream to generate the input data sequence.

20. The computer program product of claim 14, the process further comprising generating a plurality of perturbed data sequences, wherein the training data includes the plurality of perturbed data sequences.

* * * * *